United States Patent [19]
Suh

[11] Patent Number: 5,851,388
[45] Date of Patent: Dec. 22, 1998

[54] WATER PURIFIER WITH STERILIZING DEVICE

[75] Inventor: Sang-Wook Suh, Pyungtak, Rep. of Korea

[73] Assignee: Samsung Electronics Co., Ltd., Suwon, Rep. of Korea

[21] Appl. No.: 764,106

[22] Filed: Dec. 6, 1996

[30] Foreign Application Priority Data

Apr. 2, 1996 [KR] Rep. of Korea ......................... 96-9920
May 29, 1996 [KR] Rep. of Korea ....................... 96-18605

[51] Int. Cl.[6] ........................................................ C02F 9/00
[52] U.S. Cl. ...................... 210/257.2; 210/260; 210/266; 210/282
[58] Field of Search .................................... 210/694, 256, 210/257.1, 259, 266, 282, 283, 284, 484, 501, 502.1, 505, 900, 257.2, 260

[56] References Cited

U.S. PATENT DOCUMENTS

| | | | |
|---|---|---|---|
| 3,327,859 | 6/1967 | Pall | 210/282 |
| 3,817,860 | 6/1974 | Lambert et al. | 210/501 |
| 3,870,033 | 3/1975 | Faylor et al. | 210/900 |
| 4,160,727 | 7/1979 | Harris | 210/900 |
| 5,607,595 | 3/1997 | Hiasa et al. | 210/694 |

*Primary Examiner*—Ivars Cintins
*Attorney, Agent, or Firm*—Burns, Doane, Swecker & Mathis, L.L.P.

[57] ABSTRACT

A water purifier includes a water storage tank and a plurality of filters which purify water delivered to the storage tank. A water sterilizer is provided for inhibiting the growth of bacteria in the purified water. The sterilizer comprises a cartridge in which an antibiotic substance, such as an iodine resin, is disposed. The sterilizer can be disposed within a filter, such as a final one of the filters, or it can be disposed in a water conduit of the filtering system.

3 Claims, 7 Drawing Sheets

# WATER PURIFIER WITH STERILIZING DEVICE

BACKGROUND OF THE INVENTION

1. Field of the Invention

The present invention relates to a water purifier for suppressing increase of bacteria in water when the water is stored in a storage tank for a long time.

2. Description of the Prior Art

Figure 1:
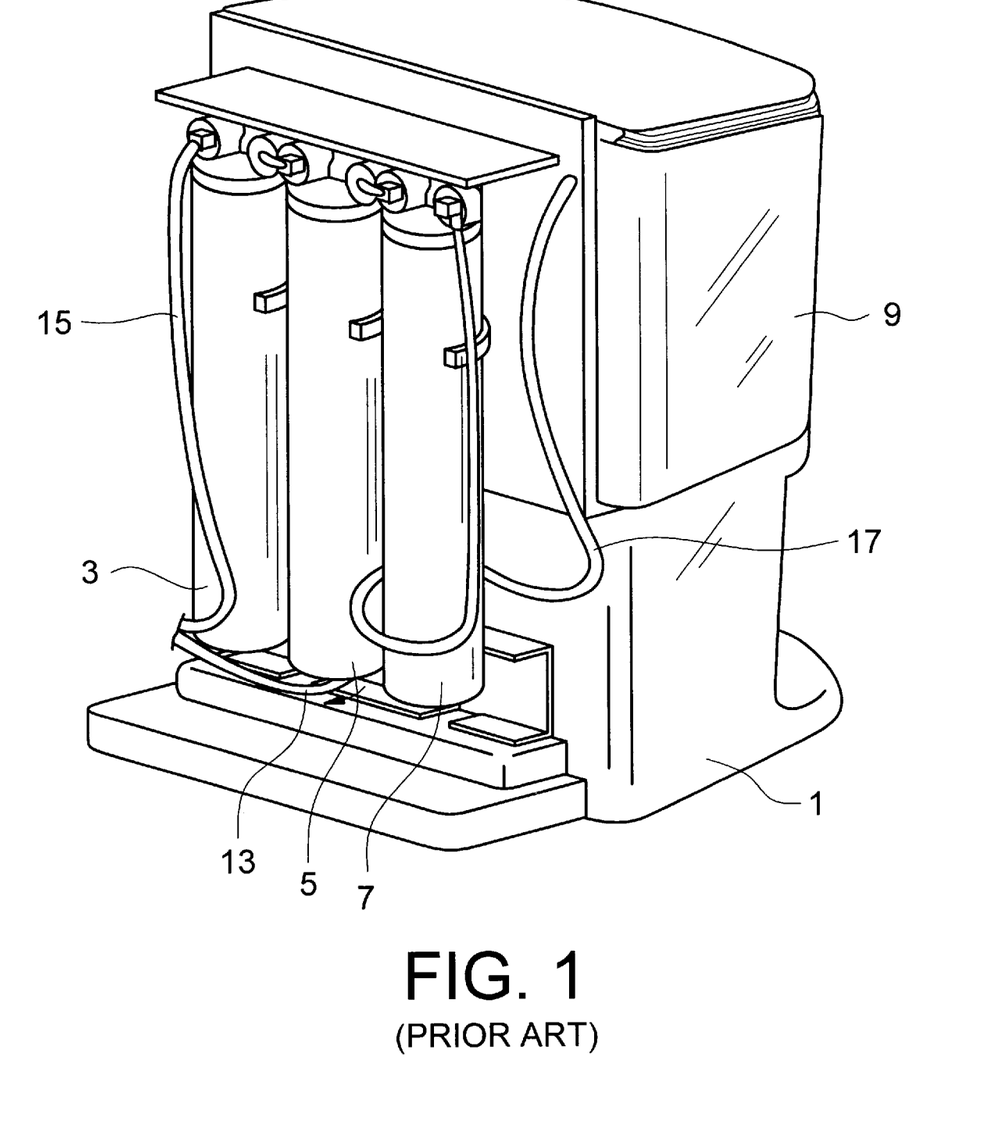
FIG. 1 is a perspective view for schematically illustrating a water purifier according to the prior art.
Figure 2:
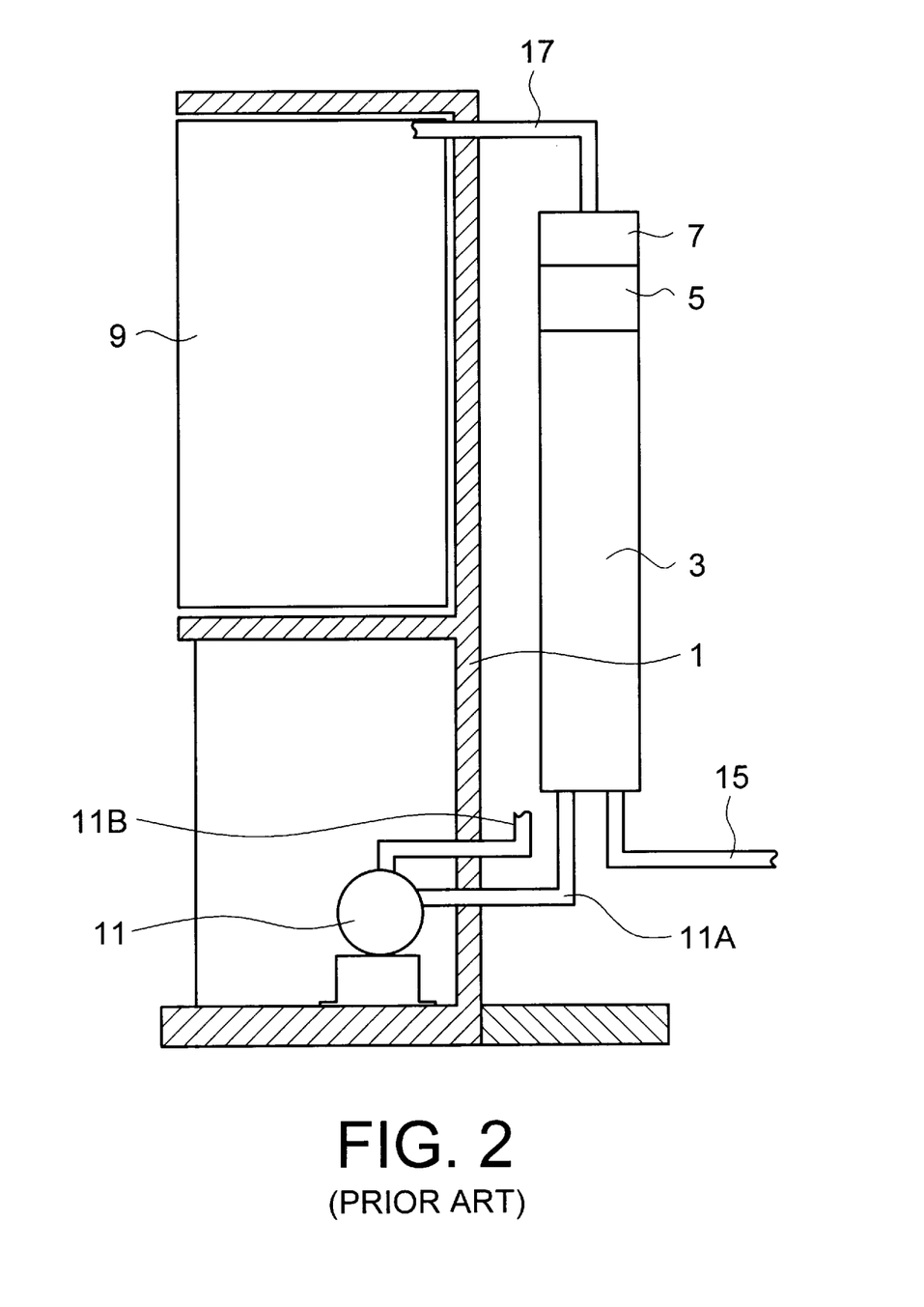
FIG. 2 is a longitudinal sectional view for schematically illustrating the construction of the water purifier according to the prior art.

Generally, a water purifier includes, as illustrated in FIGS. 1 and 2, pre-process filtering means 3 disposed at a rear side of a body 1 for removing chlorine substance contained in tap water infused from a faucet (not shown) and various foreign objects and at the same time for eliminating various harmful organic compounds. A membrane filtering means 5 is disposed at one side of the pre-process filtering means 3 to thereby remove various heavy metals and cancer-causing materials contained in the water having passed the pre-process filtering means 3, and post-process filtering means 7 is disposed at one side of the membrane filtering means 5 to thereby eliminate odor and gaseous substance contained in the water having passed the membrane filtering means 5. A storage tank 9 is disposed at a front side of the body 1 to thereby store the water purified by the post-process filtering means 7. A pressure pump 11 is disposed within the body 1 to thereby receive the water filtered by the pre-process filtering means 3, increase its pressure and send same to the membrane filtering means 5, so that the water filtered by the preprocess filtering means 3 can penetrate a membrane formed with fine holes respectively having a diameter of 0.001$\mu$ (micron) in the membrane filtering means 5.

The membrane filtering means 5 is arranged at a lower side thereof with a drainage tube 13 for draining concentrated waste water which has not passed through the membrane filtering means 5.

The preprocess filtering means 3 is provided at one side thereof with a primary water supply tube 15 for conducting the primary water supplied from the faucet (not shown), while the post-process filtering means 7 is formed at one side thereof with a purified water supply tube 17 for conducting the purified water to the storage tank 9.

Meanwhile, reference numeral 11a is a passage through which the water from the pre-process filtering means 3 is conducted.

Reference numeral 11b is another passage through which the purified water from the passage 11a and pressured by the pressure pump 11 passes into the membrane filtering means 5.

When a switch on a manipulating terminal (not shown) is manipulated, the pressure pump 11 is activated and the tap water supplied from the faucet passes through the primary water supply tube 15 and through the pre-process filtering means 3 to thereafter be filtered and raised in pressure by the pressure pump 11.

The water raised in pressed by the pressure pump 11 sequentially passes through the membrane filtering means 5 and the post-process filtering means 7 to thereafter be filtered and sterilized.

The water is then stored in the storage tank 9 through the purified water supply tube 17, and the purified water is dispensed through a dispensing valve (not shown) communicating with one side of the storage tank 9.

At this time, the concentrated water which has not passed through the membrane filtering means 5 is discharged through the drainage tube 13.

However, there is a problem in the water purifier according to the prior art thus constructed in that, although germs are filtered through the plurality of filtering means before the water is sent to the storage tank 9, a possibility can exist where the number of germs can be increased in case the water is stored in the storage tank 9 for a long time or the tank 9 is not cleaned for a long time.

SUMMARY OF THE INVENTION

Accordingly, it is an object of the present invention to provide a water purifier provided with antibiotic means in a purified water passage so as to suppress an increase of general bacteria when water is stored in a storage tank for a long time or the tank is not cleaned over a long period of time.

In accordance with the object of the present invention, there is provided a water purifier provided with antibiotic means at one side of a plurality of filtering means in order to restrain an increase of general bacteria when the purified water is stored for a long time in a storage tank or when the tank is not cleaned over an extended long period of time.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF PREFERRED EMBODIMENTS OF THE INVENTION

Now, preferred embodiments of the water purifier according to the present invention will be described in detail with reference to the accompanying drawings.

Figure 3:
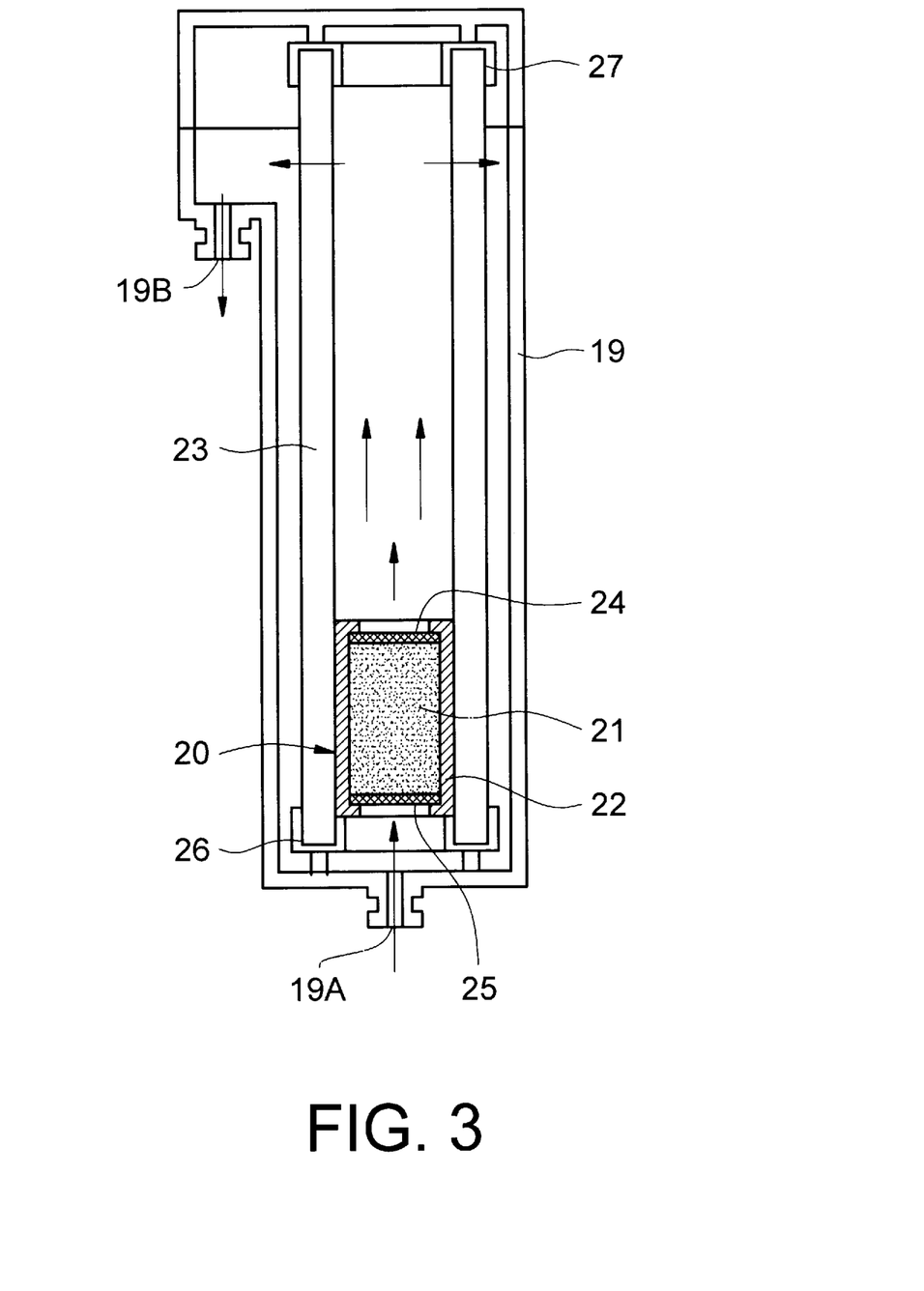
FIG. 3 is a longitudinal sectional view for schematically illustrating filtering means disposed with antibiotic means according to a first embodiment of the present invention.

FIG. 3 is a longitudinal sectional view for schematically a water purifier mounted with antibiotic means according to a first embodiment of the present invention.

The water purifier according to the first embodiment of the present invention includes post-process filtering means 19 for purifying the water having passed through membrane filtering means (see reference numeral 5 in FIG. 1). The post-process filtering means 19 is provided with antibiotic means 20 for preventing the purified water from being increased with general bacteria to thereby improve the capability of the purified water.

The antibiotic means 20 is shaped as a cartridge 22 stuffed with iodine resin 21.

The cartridge 22 is disposed in an inner side of a tube of fibriform activated carbon 23 i.e., carbon in fibrous form, which removes odor and gaseous components that have permeated into the water.

The cartridge 22 is provided both at an upper side and a lower side thereof with mesh members 24 and 25 through which the purified water can pass.

Reference numerals 26 and 27 are sealing members for preventing leakage and reference numeral 19a represents an inlet through which the water having passed the membrane filtering means (not shown) can be infused.

Reference numeral 19b is an outlet through which the water having passed the iodine resin 21 and the fibriform activated carbon 23 can be discharged.

Although the first embodiment of the present invention includes the antibiotic means 20 being disposed at a lower end of the post-process means 19, the present invention is not limited thereto. It is possible to have the antibiotic means 20 disposed at an upper end of the post-process filtering means 19 through which the water is discharged, and the provision of more than one antibiotic means 20 is also possible.

Next, an operational effect of the water purifier according to the first embodiment of the present invention thus constructed will be described.

The water having passed the membrane filtering means is infused through the inlet 19a of the filter 19 and into an inner side of the cartridge 22 through the mesh member 25.

At this time, the infused water is sterilized as it contacts the iodine resin 21 comprising a multitude of granules.

Furthermore, the water rises in an arrow direction in FIG. 3 and at the same time passes through the fibriform activated carbon 23 to remove gas, odor and the like and is then discharged through the outlet 19b.

Meanwhile, the iodine resin 21 can deactivate the bacteria as well as virus even in a short period of encounter with the water, so that almost perfect sterilization can be possible.

Moreover, the iodine resin 21 is economical in that it needs no electrical appliances for sterilization, and an average life thereof is about 2 years so that it its exchange period coincides with that of the post-process filtering means 19.

Next, a water purifier according to a second embodiment of the present invention will be described in detail with reference to FIG. 4.

Figure 4:
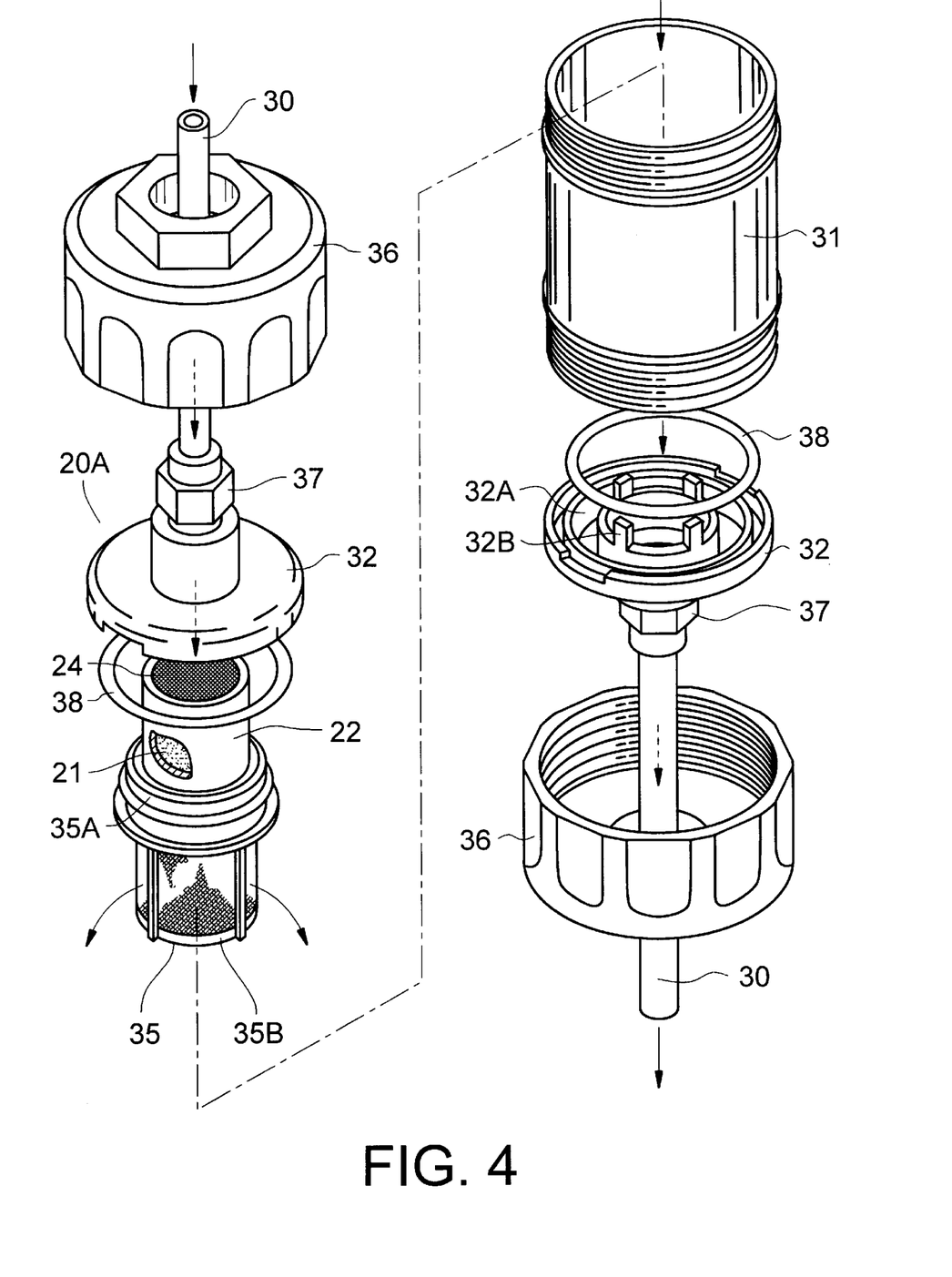
FIG. 4 is an exploded view for illustrating an antibiotic means according to a second embodiment of the present invention.

Throughout the drawing in FIG. 4, like reference numerals as used in FIG. 3 are used for the designation of like or equivalent parts or portions for simplicity of illustration and explanation.

The water purifier according to the second embodiment of the present invention is formed with a hose member 30, as illustrated in FIG. 4, connected to an outlet of the membrane filtering means (reference numeral 5 in FIG. 1).

On the other hand, a case member 31 is connected to the hose member 30 as illustrated in FIG. 4. The case member 31 is attached at both sides to connecting members 32 in order to connect sections of the hose member 30 to the case member 31.

The case member 31 is provided therein with an antibiotic device 20A which includes a cartridge 22 stuffed with iodine resin 21 so as to sterilize the water infused through one of the sections of the hose member 30.

The case member 31 is provided therein with a cylindrical mesh 35 located at an external side of the cartridge 22 so as to fixedly secure the cartridge 22.

The case member 31 is screwed at both sides thereof to nut members 36 in order to prevent breakaway of the hose member 30.

The connecting member 32 is formed with an insertion ring 32a inserted into the case member 31, and with a press ring 32b at a predetermined spacing from the ring 32a in order to receive the cylindrical mesh 35.

Furthermore, the connecting member 32 is fixedly connected to the hose member 30 so that the hose member 30 can be inserted into a fixing member 37.

The cartridge 22 is provided at both ends thereof with a mesh member 24 so as to pass water therethrough and to prevent the iodine resin 21 from being washed away.

The cylindrical mesh 35 has an opened end 35a so as to facilitate infusion of the purified water and simultaneously to allow the cartridge 22 to be inserted thereinto.

Still furthermore, the other end 35b of the cylindrical mesh 35 is flat so as to be fixed by the press unit 32b of the connecting member 32.

Reference numeral 38 is a sealing member for preventing a leakage of the water.

When the purified water is infused through the hose member 30 along an arrow, direction as illustrated in FIG. 4, the purified water is infused through the mesh member 24 disposed at an upper end of the cartridge 22. The infused water is sterilized by being contacted with the iodine resin 21 and is discharged through a mech member (not shown) provided at a lower end of the cartridge 22 and simultaneously passes through the cylindrical mesh 35. The water having passed through the cylindrical mesh 35 is discharged through the hose member 30.

On the other hand, when iodine resin 21 is exhausted, the nut member 36 is unlocked and the connecting member 32 is removed from the case member 31.

The cylindrical mesh 35 is then extracted and the cartridge 22 is extracted. A cartridge stuffed with new iodine resin 21 is inserted into the cylindrical mesh instead.

Replacement work can be finished by the antibiotic means 20A re-assembled by reversing the above steps.

Accordingly, the iodine resin 21 can be easily replaced by a simple job on the part of a user.

Another embodiment (a third embodiment) of the present invention will be explained with reference to FIGS. 5 and 6.

Figure 5:
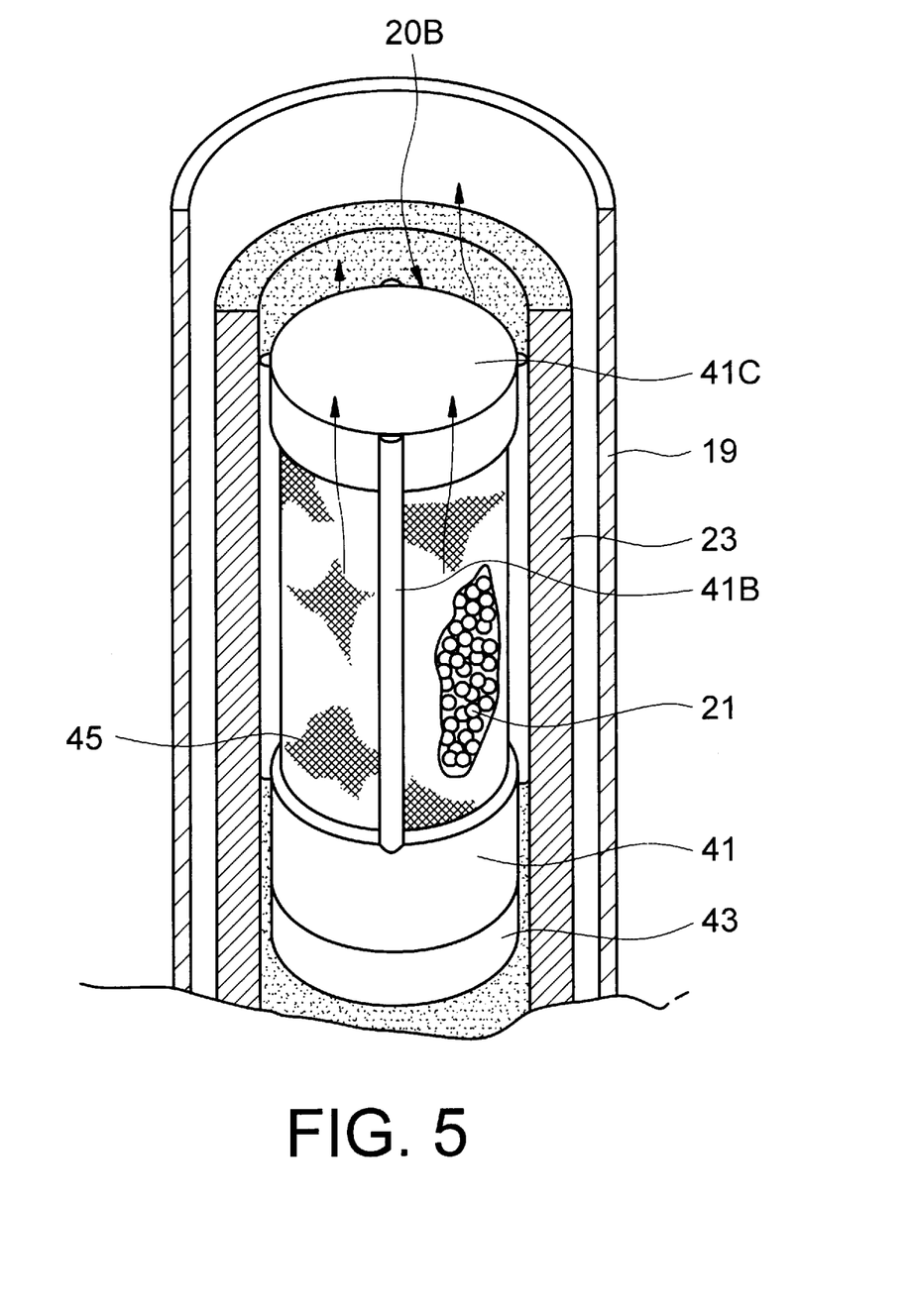
FIG. 5 is a sectional perspective view for illustrating an antibiotic means according to a third embodiment of the present invention.
Figure 6:
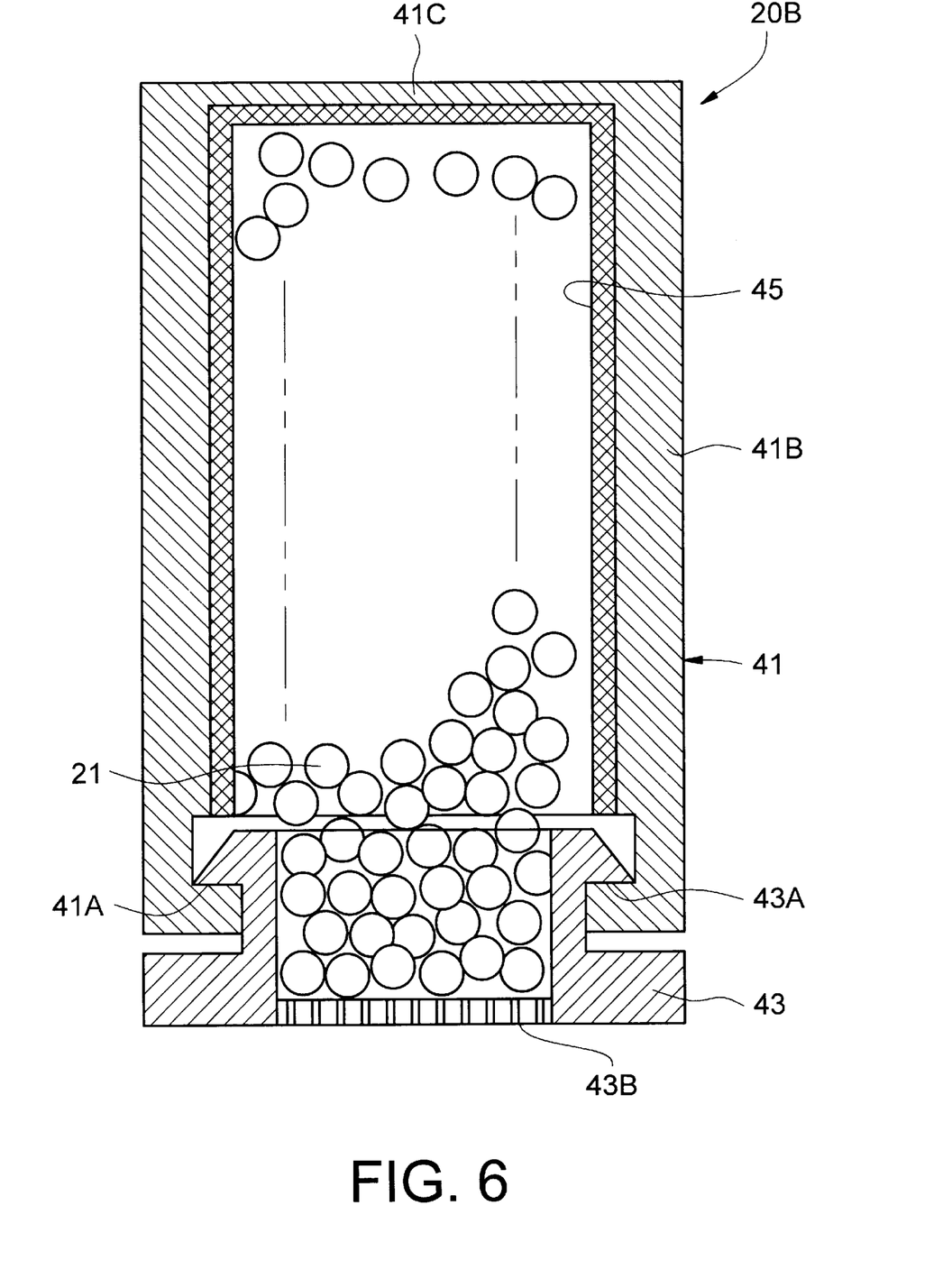
FIG. 6 is a sectional view of the antibiotic means in FIG. 5.

A water purifier according to the third embodiment is provided with antibiotic means 20B at an inner side of fibriform activated carbon 23 of the post-process filtering means 19, as illustrated in FIGS. 5 and 6.

The antibiotic means 20B includes a cartridge body 41 disposed in the fibriform activated carbon 23. The body 41 contains iodine resin 21 composed of a multitude of granules, thereby sterilizing purified water passing through the cartridge body 41. A cartridge lid 43 is disposed resin 21 from being discharged from the cartridge body 41. A mesh member 45 surrounds the resin 21 for filtering easily the sterilized purified water.

The mesh member 45 is fixed to the inside of the body 41 by a high frequency fusion method.

The cartridge lid 43 is formed at one side thereof with a latch 43a, thereby preventing same from being detached from the cartridge body 41 after the cartridge lid body 43 is inserted into the cartridge 41. Further, the cartridge lid 43 is formed at one side thereof with fine holes 43b for admitting purified water into the cartridge body 41.

The fine holes 43b are smaller in diameter than the granule size of the iodine resin 21.

The cartridge body 41 is formed with longitudinal reinforcing frames 41b to reinforce the mesh member 45, and is provided at the upper side thereof with a round plate 41C.

In the antibiotic means 20B thus constructed, when the purified water filtered by a filtering means (not shown) is infused into the post-process filtering means 19, the infused purified water is then infused into the cartridge body 41 through fine holes 43b formed in the cartridge lid 43.

The infused purified water contacts the iodine resin 21 composed of a multitude of granules and is sterilized.

The purified water is then discharged through the mesh member 45 mounted at a body side of the cartridge 41.

The sterilized water passes through the fibriform activated carbon 23 to thereby have changed harmful gas such as odor and the like and to be removed.

The antibiotic means 20B thus constructed can be easily stuffed with the iodine resin 21 by way of separation of the cartridge lid body 43.

In the above description, it should be noted that the round plate 41C formed at the upper side of the cartridge body 41 can be formed with fine holes through which the iodine resin 21 cannot escape to thereby allow only the water to be discharged therethrough.

Next, the iodine resin 21 used in the first, second, and the third embodiment will be described.

Elements of the halogen group as the 7B group of elements is called in the Periodic Table of the Elements include chlorine, bromine, iodine and the like, which exist as elementary molecules ($Cl_2$, $Br_2$, $I_2$ and the like) a room temperature.

Furthermore, chlorine exists as gas, bromine exists as liquid, and iodine exists as a solid.

The elements of the halogen group have excellent in sterilizing power so that they are widely used as a disinfectant.

Chlorine has been widely used in filtration plants, swimming pools and the like, and bromine has been used for the sterilization of Legionella in swimming pools or in cooling towers.

Halogen iodine resin is made by a method where iodine and negative ion exchange resin are epidemiologically absorbed and reacted, to thereby become a stable compound having low solubility in water.

The halogen iodine resin leaves almost zero residual of iodine compound in water having passed through the resin and is excellent in sterilizing power.

The sterilizing behavior has not been determined yet. However the sterilizing behavior is assumed to work under the following electric charge distribution.

$$Resin-N^- \ldots I-I-I\delta^+$$

where $\delta^+$ defines a positive electric charge.

As seen from the above, when the electric charge gets bipolar, an iodine atom charged with a positive electric charge at a tip end thereof will attract bacteria charged with a negative electric charge, thereby expediting contact between the bacteria and $I_3$ group.

The iodine resin 21 has generally a size of 0.1 mm—0.3 mm in diameter. However it is more advisable to form the size of the iodine resin of fine 0.4 mm–1.2 mm in diameter and the weight of the iodine resin 21 which is used is advisable to be 10–20 grams.

Although the present invention has described the antibiotic means 20 disposed only in a water purifier, it is not to be taken as limiting. Still the present invention can be applied to all appliances utilizing water such as cool/hot water maker, a medicinal water canteen, a mineral water canteen, and a faucet vending machine.

Figure 7:
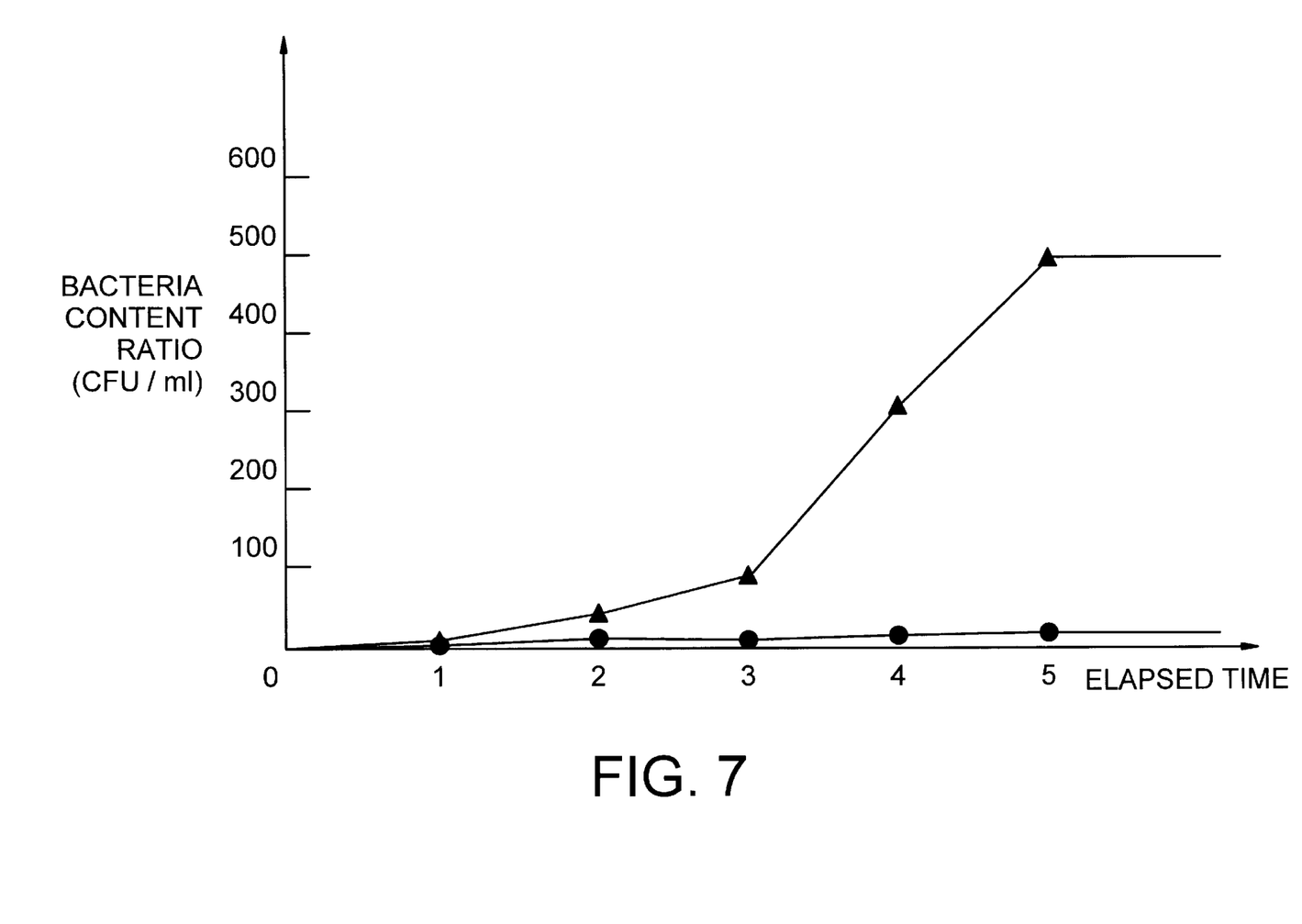
FIG. 7 is a graph for illustrating a change of bacteria content ratio versus time in a water purifier according to the prior art and according to the present invention.

By way of reference, FIG. 7 represents a graph for illustrating a bacteria contact ratio of water vs. elasped time, where a line connected by circles represents a measured value of bacteria of a water purifier disposed with antibiotic means according to the present invention and a line connected by triangles defines a measured value of bacteria of a water purifier according to the prior art.

As shown in FIG. 7, bacteria content increases significantly in the prior art.

However, it should be noted that bacteria content ratio of the water purifier according to the present invention increases little from an initial date.

Accordingly, it can be ascertained that the water purifier mounted with antibiotic means according to the present invention has less increase of bacteria.

As apparent from the foregoing, there is an advantage in the water purifier according to the present invention, in that antibiotic means is disposed at one side of passage in the water purifier to sterilize bacteria and to increase a keeping capability of the purified water.

What is claimed is:

1. A water purifier comprising:

a storage tank; and a water conducting system including filters for purifying water and conducting the purified water to the storage tank, the filters including a membrane filter, and a post-process filter for filtering water received from the membrane filter, the post-process filter comprising:

a hollow cylindrical tube having radially spaced outer and inner surfaces, with activated carbon disposed therebetween, the inner surface forming an interior of the tube for conducting a flow of water through the tube, and a cylindrical cartridge disposed in the interior of the tube and extending across a cross section of the interior, the cartridge forming a water inlet and a water outlet for enabling the flow of water to pass through the cartridge, the cartridge containing an antibiotic comprised of iodine resin for inhibiting a growth of bacteria in the water.

2. A water purifier according to claim 1 wherein the water inlet and water outlet are located at opposite ends of the cartridge.

3. A water purifier comprising:

a storage tank; and a water conducting system including filters for purifying water and conducting the purified water to the storage tank, the filters including a membrane filter, and a post-process filter for filtering water received from the membrane filter, the post-process filter comprising:

a cylindrical case member, first and second connecting members extending across respective opposite ends of the case member, each connecting member including a hollow fixing member for admitting a flow of water, a side facing an interior of the case member, the side carrying an insertion ring and a press ring spaced radially inwardly from the insertion ring, the insertion ring projecting into an interior of the case member for orienting the case member coaxially with respect to the connecting members;

a pair of nut members surrounding respective connecting members and screwed to respective opposite ends of the case member for securing the connecting members to the case member, a pair of hose sections passing through respective nut members and secured to respective fixing members, one of the hose sections arranged for conducting water to the case member, and the other hose section arranged for conducting water away from the case member, a cylindrical mesh disposed in the case member and having opposite ends received in respective press rings for orienting the cylindrical mesh coaxially with respect to the case member, one of the ends being open and the opposite end being closed, a cylindrical cartridge disposed within the cylindrical mesh, opposite ends of the cartridge including a mesh allowing water to flow through the cartridge, whereby a water flow path is defined by: one of the hose sections, one end of the cartridge, the other end of the cartridge, the cylindrical mesh, and the other hose section; the cartridge containing an antibiotic material comprising iodine resin for sterilizing water passing through the cartridge.

* * * * *